US012744710B2

(12) United States Patent
Watanabe

(10) Patent No.: US 12,744,710 B2
(45) Date of Patent: Sep. 22, 2026

(54) SYSTEM IN WHICH PLURAL CONTROLLED DEVICES AND MAIN CONTROL DEVICE ARE CONNECTED VIA NETWORK

(71) Applicant: CANON KABUSHIKI KAISHA, Tokyo (JP)

(72) Inventor: Yasuhiro Watanabe, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 361 days.

(21) Appl. No.: 18/462,630

(22) Filed: Sep. 7, 2023

(65) Prior Publication Data

US 2024/0089175 A1 Mar. 14, 2024

(30) Foreign Application Priority Data

Sep. 13, 2022 (JP) ................................ 2022-145571

(51) Int. Cl.
*H04L 41/085* (2022.01)
*H04L 67/12* (2022.01)

(52) U.S. Cl.
CPC ............ *H04L 41/085* (2013.01); *H04L 67/12* (2013.01)

(58) Field of Classification Search
CPC .............................. H04L 41/085; H04L 67/12
USPC .......................................................... 370/476
See application file for complete search history.

(56) References Cited

U.S. PATENT DOCUMENTS 7,433,740 B2 * 10/2008 Hesse .................... G05B 15/02 700/1
8,390,424 B2 * 3/2013 Choi ...................... G05B 15/02 340/3.1
9,618,922 B2 * 4/2017 Nishiyama ............. G05B 19/05
10,243,755 B2 * 3/2019 Osagawa .................. H04L 1/20
10,496,780 B1 * 12/2019 Lam .................... H01L 21/0274
10,504,420 B2 * 12/2019 Katayama .......... H10D 30/6757

(Continued)

FOREIGN PATENT DOCUMENTS

AU 2015298203 A1 * 2/2017 ....... H04L 12/40176
JP 6615018 B2 12/2019
TW 202201138 A 1/2022
WO 2015166953 A1 11/2015
WO WO-2019124275 A1 * 6/2019 ............ H04L 69/14

OTHER PUBLICATIONS

D. Jansen and H. Buttner, “Ethernet: EtherCAT”, Computing and Control Engineering, vol. 15, issue 1, pp. 16-21, 2004. (Year: 2004).*

(Continued)

*Primary Examiner* — Melvin H Pollack

(74) *Attorney, Agent, or Firm* — ROSSI, KIMMS & McDOWELL LLP

(57) ABSTRACT

In a system, a plurality of controlled devices, including a first controlled device and a second controlled device, and a main control device configured to control the plurality of controlled devices are connected via a network. The main control device includes a communicator configured to transmit and receive a data frame including a plurality of data areas via the network in a predetermined cycle, and a setter configured to set a structure of the data frame. The setter has a function of setting the same data area in the data frame as a data area in which the first controlled device should write data and a data area from which the second controlled device should read data.

21 Claims, 13 Drawing Sheets

(56) References Cited

U.S. PATENT DOCUMENTS 10,515,048 B2 * 12/2019 Lee ........................ G06F 3/0655
10,678,233 B2 * 6/2020 Cella ..................... H04L 47/122
10,777,441 B2 * 9/2020 Ichinose ................... G03F 1/42
11,036,205 B2 * 6/2021 Fukuda ............. H04L 12/40189
11,082,197 B2 * 8/2021 Yoneda ................... H04L 12/28
11,128,571 B2 * 9/2021 Yoneda ............... G06F 13/4247
11,274,919 B2 * 3/2022 Ichinose ................... G03F 1/42
11,323,548 B2 * 5/2022 Entelis ................ H04L 67/5651
11,374,788 B2 6/2022 Tahara
11,451,260 B2 * 9/2022 Scholand ............... H04B 1/715
11,703,546 B2 * 7/2023 Urban .................. G01R 31/378 702/63
11,776,596 B2 * 10/2023 Yamazaki ........... G11C 11/4045 365/189.011
11,800,331 B2 * 10/2023 Lupper .................. H04B 7/022
11,811,547 B2 * 11/2023 Yoneda ............... H04L 12/4035
11,940,943 B2 * 3/2024 Ryan ..................... H04L 12/413
12,086,003 B2 * 9/2024 Beavis .................... H04L 12/12
12,222,708 B2 * 2/2025 Yoneda .............. G05B 19/4188
12,349,004 B2 * 7/2025 Mukherjee ............ H04L 1/1835
12,353,203 B2 * 7/2025 Cella .................... H04B 17/309
12,399,274 B2 * 8/2025 Kostanic ................. G01S 19/10
12,464,514 B2 * 11/2025 Takahashi ............. H04W 72/12
2009/0235243 A1 * 9/2009 Jung ......................... G06F 8/60 717/174
2017/0170983 A1 6/2017 Iwai et al.
2018/0341241 A1 * 11/2018 Song .................. G05B 19/0426
2020/0295967 A1 * 9/2020 Kuwahara .............. H04M 11/00
2022/0244712 A1 * 8/2022 Aoki ................ G05B 19/41815
2023/0308514 A1 * 9/2023 Furukawa ............ G05B 19/054
2023/0396504 A1 * 12/2023 Madegowda ....... H04L 41/0816
2023/0408901 A1 * 12/2023 Lippincott ............ G06F 30/392
2024/0314798 A1 * 9/2024 Ren ........................ H04W 76/20
2025/0055723 A1 * 2/2025 Kurahashi ............... H04L 12/40

OTHER PUBLICATIONS

D. Orfanus, R. Indergaard, G. Prytz and T. Wien, "EtherCAT-based platform for distributed control in high-performance industrial applications," 2013 IEEE 18th Conference on Emerging Technologies & Factory Automation (ETFA), Cagliari, Italy, 2013, pp. 1-8. (Year: 2013).*

Jason Hill, Robert Szewczyk, Alec Woo, Seth Hollar, David Culler, and Kristofer Pister. 2000. System architecture directions for networked sensors. SIGPLAN Not. 35, 11 (Nov. 2000), 93-104. (Year: 2000).*

A. R. Al-Ali, I. A. Zualkernan, M. Rashid, R. Gupta and M. Alikarar, "A smart home energy management system using IoT and big data analytics approach," in IEEE Transactions on Consumer Electronics, vol. 63, No. 4, pp. 426-434, Nov. 2017. (Year: 2017).*

Office Action issued in Taiwanese Appln. No. 112133439, dated Jun. 19, 2025.

Extended European search report issued in European Appln. No. 23194753.2 mailed on Feb. 8, 2024.

* cited by examiner

FIG. 1

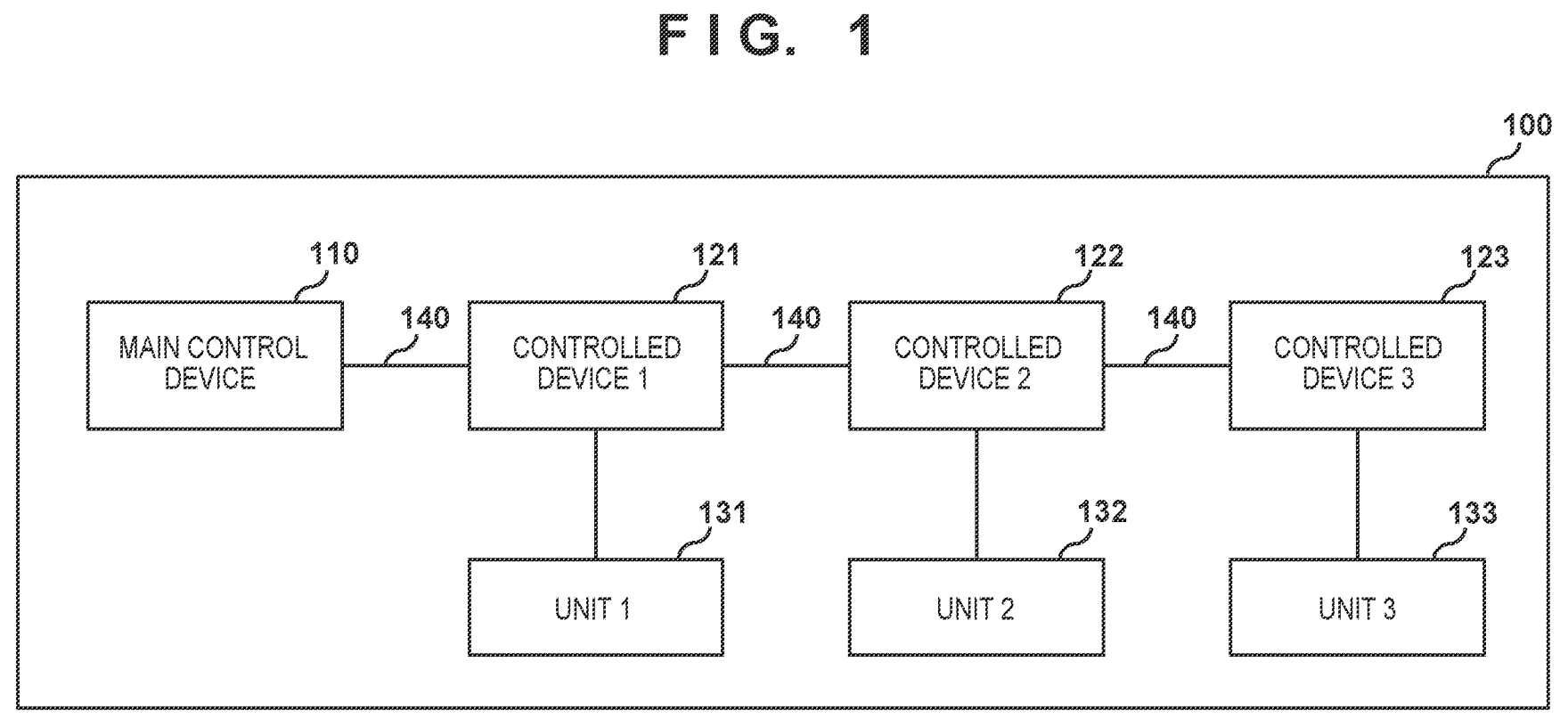

100
MAIN CONTROL DEVICE
110
140
CONTROLLED DEVICE 1
121
UNIT 1
131
140
CONTROLLED DEVICE 2
122
UNIT 2
132
140
CONTROLLED DEVICE 3
123
UNIT 3
133

230 STORAGE DEVICE

220 RAM

210 ROM

200 PROCESSOR

260 COMMUNICATION DEVICE

250 DISPLAY DEVICE

240 INPUT DEVICE 121,122,123

COMMUNICATOR 301

UNIT CONTROLLER 302

DETERMINER 303

110
121
122
201
CONTROLLED DEVICE CONTROLLER
202
COMMUNI -CATOR
301
COMMUNI -CATOR
302
UNIT CONTROLLER
301
COMMUNI -CATOR
302
UNIT CONTROLLER
FIRST CYCLIC PROCESSING
S101
DATA
S102
DATA FLAME
TRANSMIT DATA
S107
DATA
S108
DATA
S103
DATA FLAME
S104
DATA FLAME
S109
DATA
S110
DATA
S105
DATA FLAME
S106
DATA
SECOND CYCLIC PROCESSING
S121
DATA
S122
DATA FLAME
S127
DATA
S128
DATA
S123
DATA FLAME
S124
DATA FLAME
S129
DATA
RECEIVE DATA
S130
DATA
S125
DATA FLAME
S126
DATA 110
201
CONTROLLED DEVICE CONTROLLER
202
COMMUNI -CATOR
121
301
COMMUNI -CATOR
302
UNIT CONTROLLER
122
301
COMMUNI -CATOR
302
UNIT CONTROLLER
FIRST CYCLIC PROCESSING
S201
DATA
S202
DATA FLAME
TRANSMIT DATA
S207
DATA
S208
DATA
S203
DATA FLAME
S209
DATA
RECEIVE DATA
S204
DATA FLAME
S205
DATA FLAME
S206
DATA
S210
DATA
SECOND CYCLIC PROCESSING
S221
DATA
S222
DATA FLAME
S227
DATA
S228
DATA
S223
DATA FLAME
S229
DATA
S224
DATA FLAME
S225
DATA FLAME
S226
DATA
S230
DATA

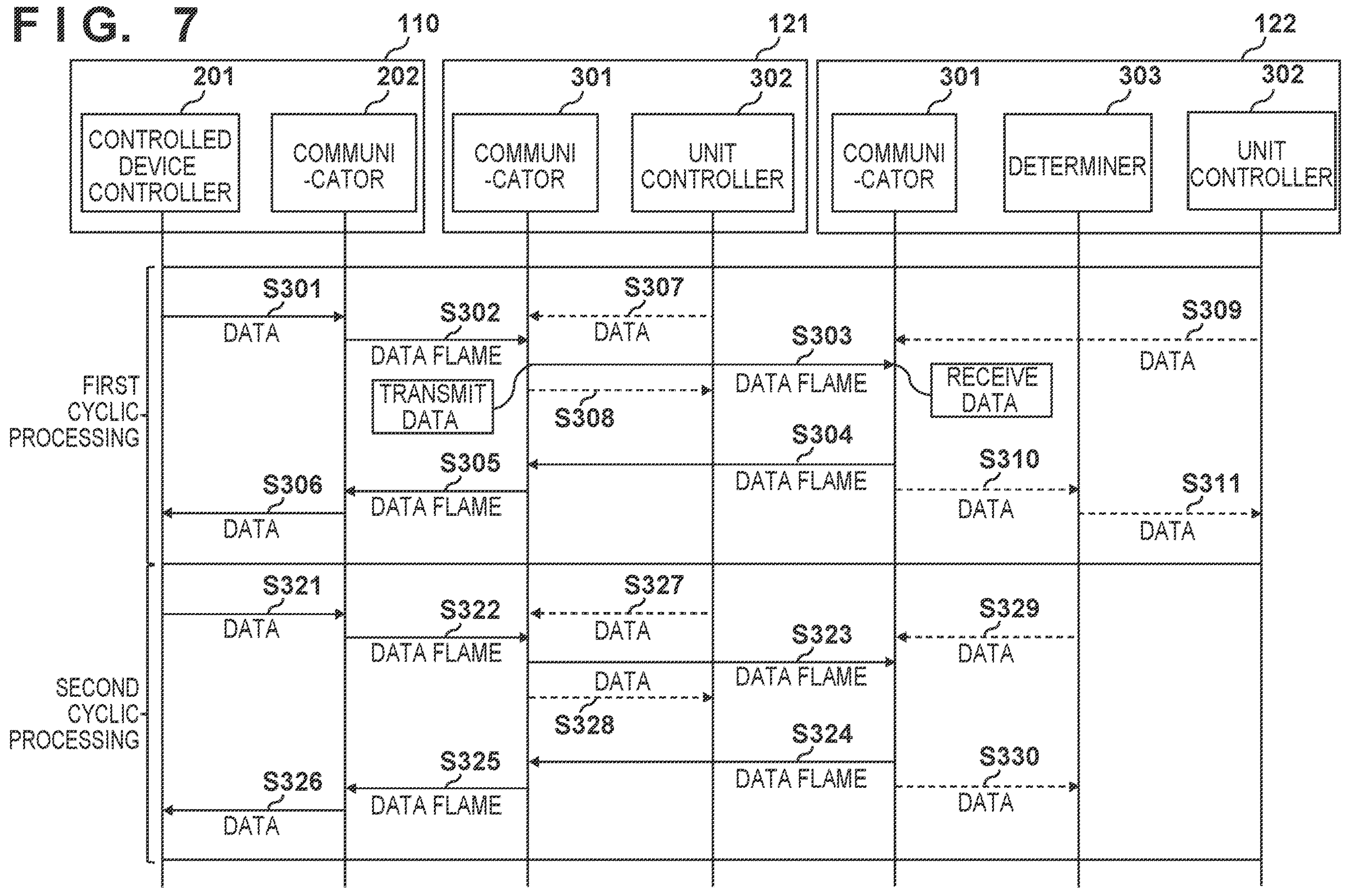

FIG. 7
110
201
CONTROLLED DEVICE CONTROLLER
202
COMMUNI-CATOR
121
301
COMMUNI-CATOR
302
UNIT CONTROLLER
122
301
COMMUNI-CATOR
303
DETERMINER
302
UNIT CONTROLLER
FIRST CYCLIC-PROCESSING
S301
DATA
S302
DATA FLAME
S307
DATA
S309
DATA
S303
DATA FLAME
TRANSMIT DATA
S308
RECEIVE DATA
S304
DATA FLAME
S305
DATA FLAME
S310
DATA
S306
DATA
S311
DATA
SECOND CYCLIC-PROCESSING
S321
DATA
S322
DATA FLAME
S327
DATA
S329
DATA
S323
DATA FLAME
DATA
S328
S324
DATA FLAME
S325
DATA FLAME
S330
DATA
S326
DATA

| IDENTIFICATION NUMBER | DATA NAME | DATA TYPE | DATA SIZE | DATA OFFSET |
|---|---|---|---|---|
| 1 | Data_In_1 | INPUT | 8 | 0 |
| | Data_Out_1 | OUTPUT | 8 | 0 |
| 2 | Data_In_2 | INPUT | 8 | 8 |
| | Data_Out_2 | OUTPUT | 8 | 8 |
| 3 | Data_In_3 | INPUT | 8 | 16 |
| | Data_Out_3 | OUTPUT | 8 | 16 |
| ... | ... | ... | ... | ... |

Figure 10:
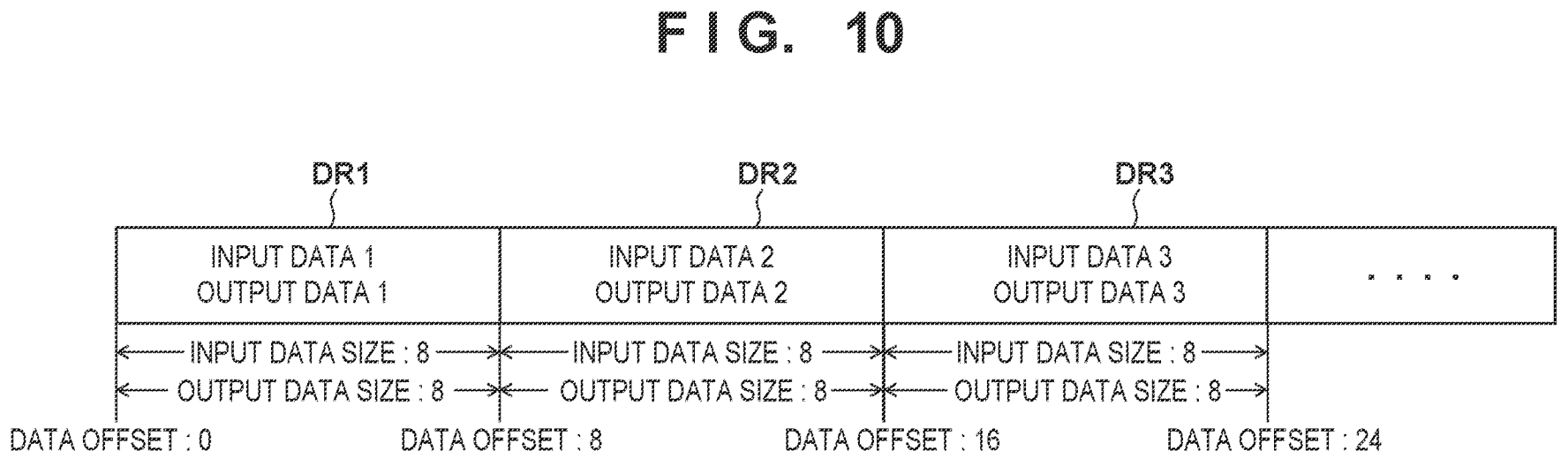

INPUT DATA 1
OUTPUT DATA 1

DR2

INPUT DATA 2
OUTPUT DATA 2

DR3

INPUT DATA 3
OUTPUT DATA 3

. . . . .

INPUT DATA SIZE : 8
OUTPUT DATA SIZE : 8

INPUT DATA SIZE : 8
OUTPUT DATA SIZE : 8

INPUT DATA SIZE : 8
OUTPUT DATA SIZE : 8

DATA OFFSET : 0
DATA OFFSET : 8
DATA OFFSET : 16
DATA OFFSET : 24

Figure 11:
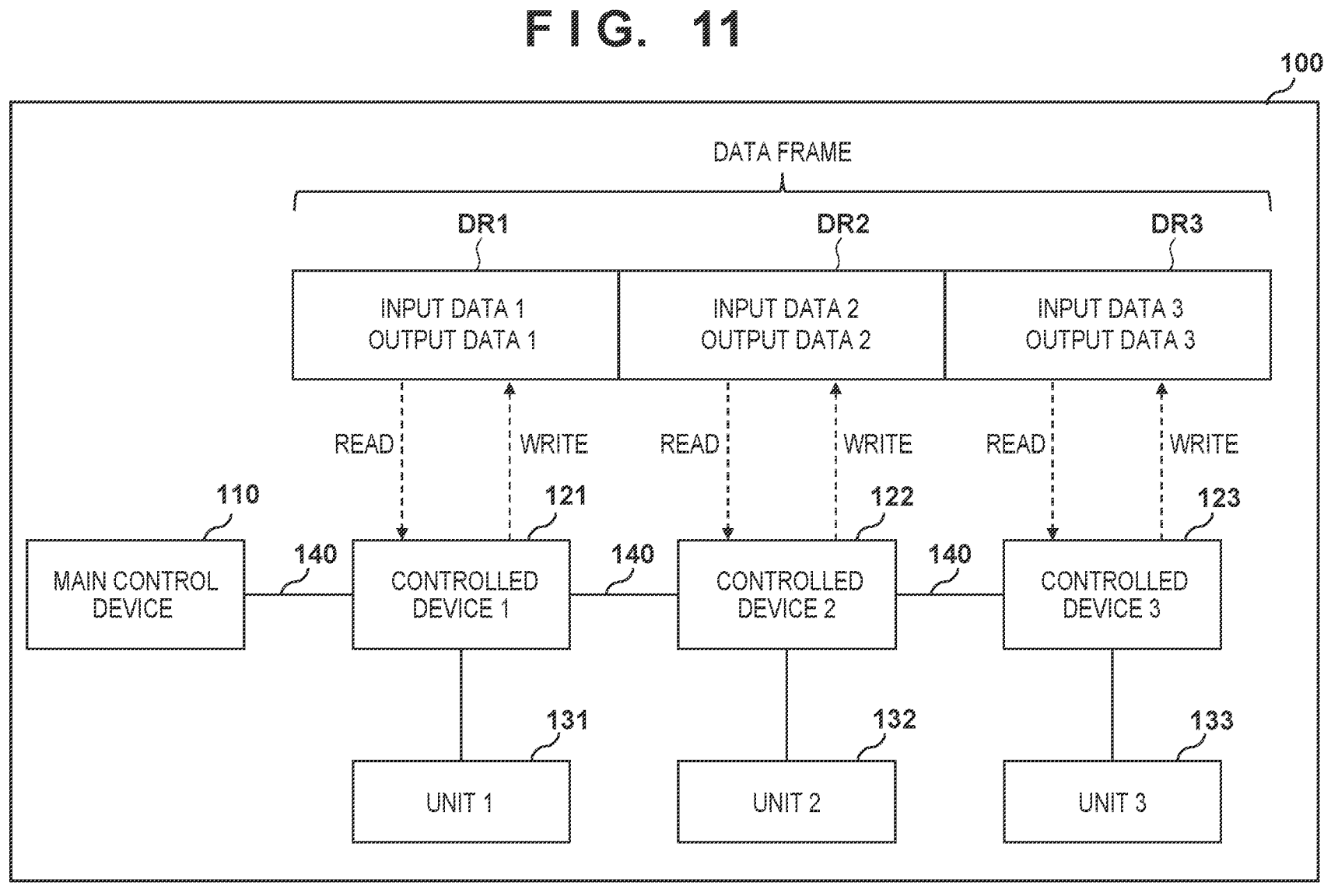

DATA FRAME

DR1
INPUT DATA 1
OUTPUT DATA 1

DR2
INPUT DATA 2
OUTPUT DATA 2

DR3
INPUT DATA 3
OUTPUT DATA 3

READ
WRITE

110
MAIN CONTROL DEVICE

140

121
CONTROLLED DEVICE 1

122
CONTROLLED DEVICE 2

123
CONTROLLED DEVICE 3

131
UNIT 1

132
UNIT 2

133
UNIT 3

FIG. 12

| IDENTIFICATION NUMBER | DATA NAME | DATA TYPE | DATA SIZE | DATA OFFSET |
|---|---|---|---|---|
| 1 | Data_In_1 | INPUT | 8 | 0 |
| 2 | Data_Out_2 | OUTPUT | 8 | 0 |
| 3 | Data_In_3 | INPUT | 8 | 8 |
| | Data_Out_3 | OUTPUT | 8 | 8 |
| ... | ... | ... | ... | ... |

Figure 14:
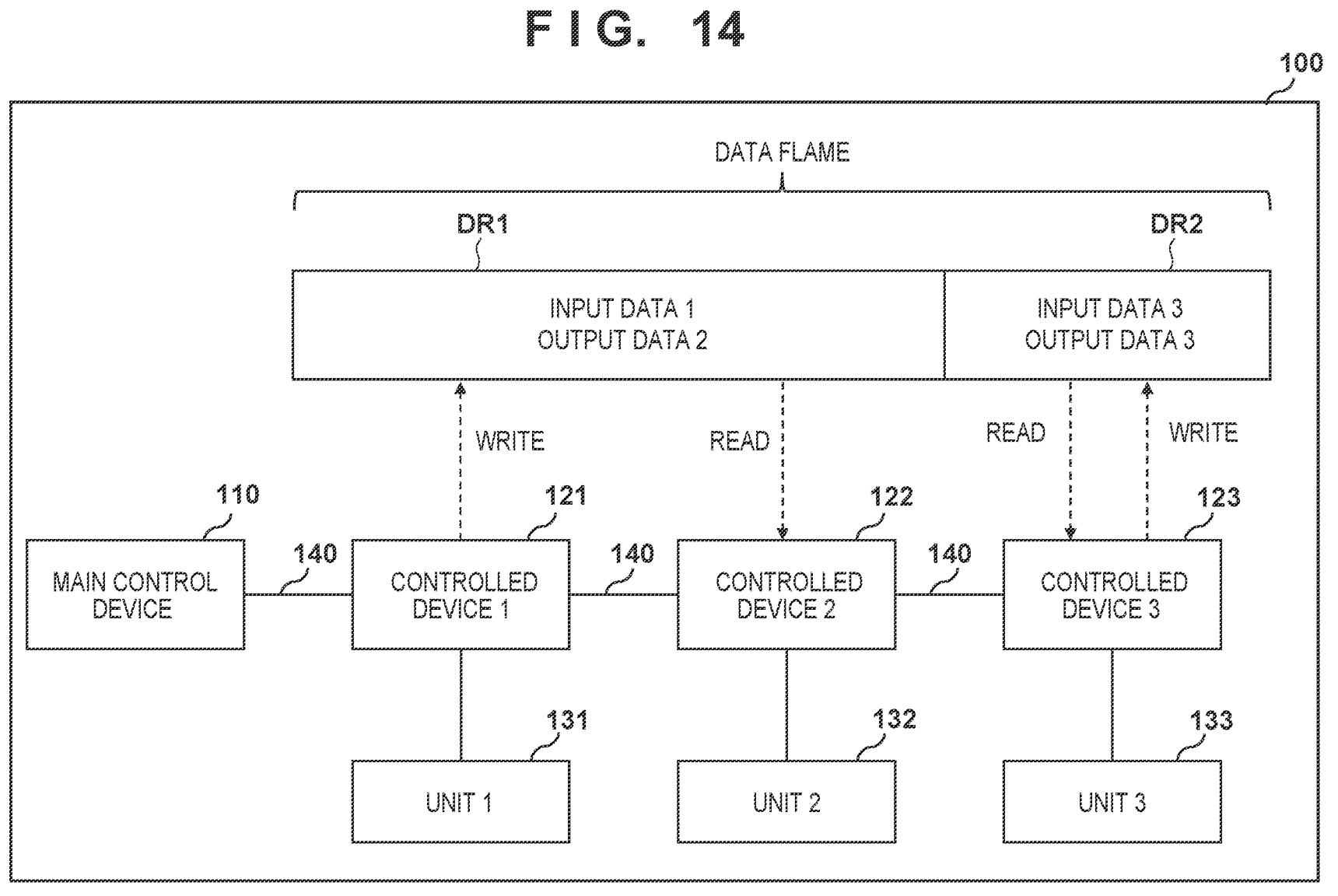

DATA FLAME

DR1

DR2

INPUT DATA 1
OUTPUT DATA 2

INPUT DATA 3
OUTPUT DATA 3

WRITE

READ

READ

WRITE

110

MAIN CONTROL DEVICE

140

121

CONTROLLED DEVICE 1

140

122

CONTROLLED DEVICE 2

140

123

CONTROLLED DEVICE 3

131

UNIT 1

132

UNIT 2

133

UNIT 3

SYSTEM IN WHICH PLURAL CONTROLLED DEVICES AND MAIN CONTROL DEVICE ARE CONNECTED VIA NETWORK

BACKGROUND OF THE INVENTION

Field of the Invention

The present invention relates to a system, a control method therefor, and a program.

Description of the Related Art

In some systems in which a main control device controls controlled devices, data communication between the main control device and the controlled device is performed in a predetermined cycle. In these systems, it is possible to perform data communication between the main control device and the controlled device, but no function of performing direct communication between the controlled devices is provided. Since an operation in which data output from one controlled device is acquired by another controlled device needs to be executed via the main control device, this operation requires a plurality of cycles to be completed. Japanese Patent No. 6615018 discloses a multiplex communication system in which data communication is performed between controlled devices without intervention of a main control device.

In the system disclosed in Japanese Patent No. 6615018, data communication is performed between the controlled devices in accordance with a communication standard different from a network via which data communication is performed between the main control device and the controlled device. Therefore, it is necessary to add, to the system, an additional network for data communication between the controlled devices.

SUMMARY OF THE INVENTION

The present invention provides a technique advantageous in enabling data communication between controlled devices without adding any network.

One of aspects of the present invention provides a system in which a plurality of controlled devices, including a first controlled device and a second controlled device, and a main control device configured to control the plurality of controlled devices are connected via a network, wherein the main control device includes a communicator configured to transmit and receive a data frame including a plurality of data areas via the network in a predetermined cycle, and a setter configured to set a structure of the data frame, and the setter has a function of setting the same data area in the data frame as a data area in which the first controlled device should write data and a data area from which the second controlled device should read data.

Further features of the present invention will become apparent from the following description of exemplary embodiments with reference to the attached drawings.

BRIEF DESCRIPTION OF THE DRAWINGS

FIG. 1 is a block diagram exemplifying the configuration of a system;

FIG. 2 is a block diagram exemplifying the arrangement of a main control device;

FIG. 3 is a block diagram exemplifying the arrangement of a processor of the main control device;

FIG. 7 is a sequence chart exemplifying a data flow in a system according to the second embodiment;

FIG. 10 is a view exemplifying the structure of a data frame;

FIG. 11 is a view showing read of data from a data frame and write of data in the data frame according to the comparative example;

FIG. 12 is a table showing an example of a network configuration information table;

FIG. 14 is a view showing read of data from a data frame and write of data in the data frame according to the first embodiment.

DESCRIPTION OF THE EMBODIMENTS

Figure 4:
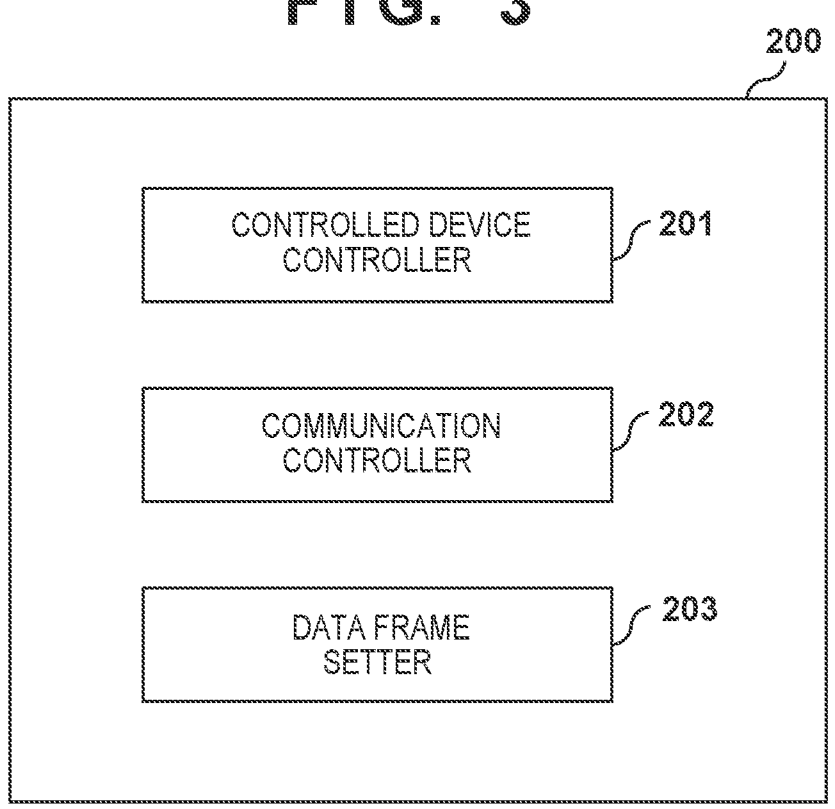
FIG. 4 is a block diagram exemplifying the arrangement of a processor of a controlled device.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

FIG. 1 exemplifies the configuration of a system 100 according to the first embodiment. As exemplified in FIG. 1, the system 100 can include a main control device 110, and a plurality of controlled devices 121, 122, and 123 controlled by the main control device 110. The main control device 110 is a control device that controls the plurality of controlled devices 121, 122, and 123. The main control device 110 and the plurality of controlled devices 121, 122, and 123 are connected via a network 140. The system 100 may include a plurality of units 131, 132, and 133, and each of the plurality of units 131, 132, and 133 can be controlled by a corresponding controlled device among the plurality of controlled devices 121, 122, and 123. The plurality of units 131, 132, and 133 can form part of one or a plurality of processing devices. The plurality of controlled devices 121, 122, and 123 can be configured to control the units 131, 132, and 133, respectively, in accordance with data given by the main control device 110 via the network 140. The controlled devices 121, 122, and 123 are controlled devices that are controlled by the main control device 110 when seen from the main control device 110, but are control devices that control the units 131, 132, and 133 when seen from the units 131, 132, and 133.

Each of the main control device 110 and the plurality of controlled devices 121, 122, and 123 can be formed by, for example, a general-purpose or dedicated computer embedded with a program. Alternatively, each of the main control device 110 and the plurality of controlled devices 121, 122, and 123 can be formed by a PLD (an abbreviation of Programmable Logic Device) such as an FPGA (an abbreviation of Field Programmable Gate Array), or an ASIC (an abbreviation of Application Specific Integrated Circuit). Alternatively, each of the main control device 110 and the plurality of controlled devices 121, 122, and 123 can be formed by a combination of all or some of the computer, the PLD, and the ASIC. Each of the plurality of units 131, 132, and 133 can be an element or a component (for example, a relay, a sensor, a servo motor, or an actuator), a module (for example, a positioning mechanism) formed from a plurality of elements or components, or a device formed from a plurality of modules. The controlled device and the unit controlled by it may be integrated.

The main control device 110 and the plurality of controlled devices 121, 122, and 123 can be connected by the network 140 so as to form a daisy chain. In the daisy chain, the first controlled device 121 can be arranged between the main control device 110 and the second controlled device 122. In the daisy chain, the second controlled device 122 can be arranged between the first controlled device 121 and the third controlled device 123.

In the example shown in FIG. 1, the plurality of controlled devices are exemplified as the first controlled device 121, the second controlled device 122, and the third controlled device 123 but the number of the plurality of controlled devices is not limited to three. Similarly, in the example shown in FIG. 1, the plurality of units are exemplified as the first unit 131, the second unit 132, and the third unit 133 but the number of the plurality of units is not limited to three.

Figure 2:
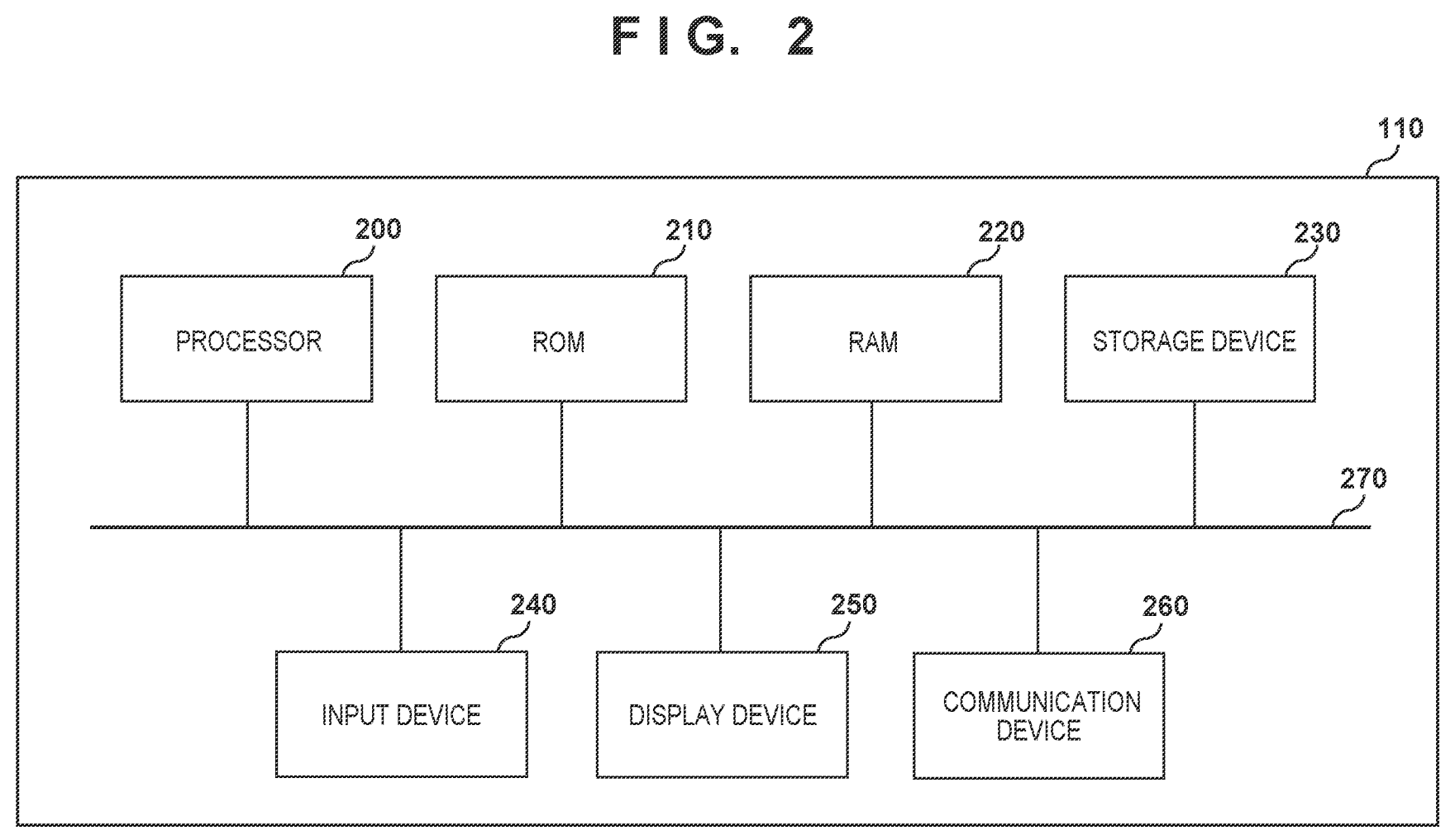

FIG. 2 exemplifies the arrangement of the main control device 110. The main control device 110 can include a processer 200, a ROM 210, a RAM 220, a storage device 230, an input device 240, a display device 250, and a communication device 260. The processer 200 can include a Central Processing Unit (CPU) that operates based on an operating system and an application program. In addition to the Central Processing Unit (CPU), the processer 200 may include an additional device such as a Micro Processing Unit (MPU), a Graphics Processing Unit (GPU), or an Application Specific Integrated Circuit (ASIC).

Each of the ROM 210, the RAM 220, and the storage device 230 is a form of a memory. The ROM 210 can store, for example, a program to be executed by the processer 200 and permanent data among calculation data. The RAM 220 provides a work area of the processer 200 and a temporary storage area for data. The ROM 210 and the RAM 220 are connected to the processer 200 via a bus 270. The input device 240 can include a pointing device such as a mouse and a keyboard. The display device 250 provides a function of displaying information. All or part of the input device 240 and the display device 250 may be formed as an integrated device such as a touch panel. The storage device 230 can include, for example, a hard disk device, a CD, a DVD, and a memory card. The storage device 230 can store a program, data, and the like. The input device 240, the display device 250, and the storage device 230 can be connected to the bus 270 via interfaces (not shown), respectively. The communication device 260 is a communication interface that provides a function of communicating with the plurality of controlled devices 121, 122, and 123 via the network 140. The communication device 260 functions as a transmitter that transmits data and a receiver that receives data, and, for example, receives response data from a transmitter (not shown) in the controlled device and stores the data in a reception buffer defined in the processer 200, the RAM 220, or the storage device 230.

FIG. 3 exemplifies the arrangement of the processer 200 of the main control device 110. The processer 200 can include a controlled device controller 201, a communication controller 202, and a data frame setter 203 (setter). The controlled device controller 201 can execute read processing of reading, from the reception buffer, response data from the controlled device. Furthermore, the controlled device controller 201 can execute control processing of generating command data for controlling the controlled device based on the response data read from the reception buffer. The controlled device controller 201 can execute write processing of writing, in a transmission buffer, the command data for controlling the controlled device.

The communication controller 202 can control transmission processing of transmitting the command data to the controlled device and reception processing of receiving data such as response data and state data from the controlled device. The communication controller 202 can transfer, to the reception buffer, data extracted from a data frame transmitted from the controlled device to the main control device 110 and received by the communication device 260. Furthermore, the communication controller 202 can cause the communication device 260 to transfer, from the transmission buffer, data to be transmitted from the main control device 110 to the controlled device, and write the data in the data frame. Each of the reception buffer and the transmission buffer is an area that temporarily stores data, and may be defined in a memory space of the processer 200 or a memory space of the RAM 220 or the storage device 230.

The data frame setter 203 can be configured to set the definition of a plurality of data areas forming the data frame based on network configuration information. For example, the network configuration information can be created in advance by the user in the main control device 110 or another information processing device, and stored in the ROM 210 or the storage device 230 of the main control device 110.

Figures 8, 9:
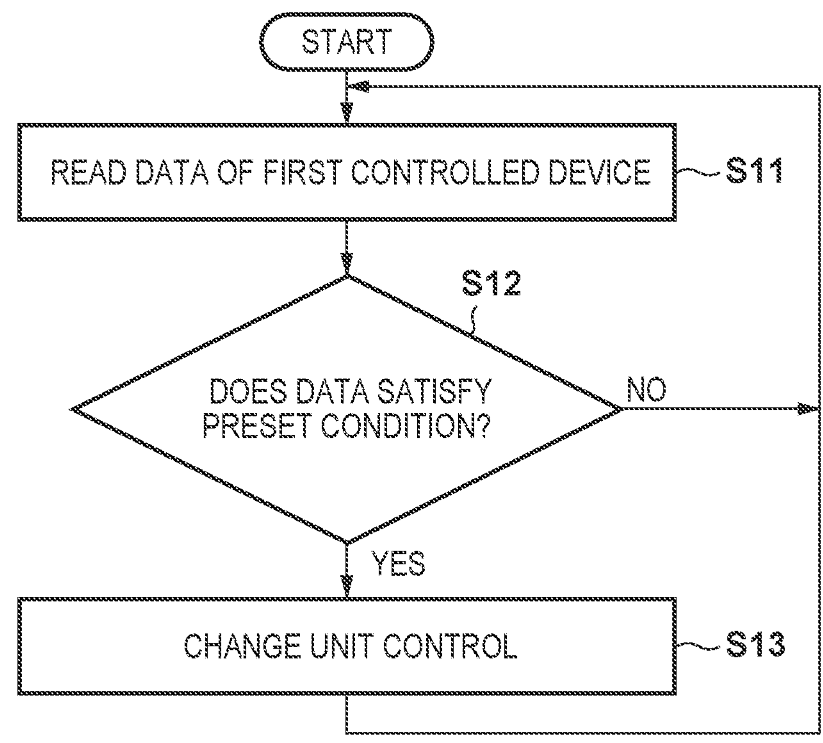
FIG. 8 is a flowchart exemplifying the operation of a second controlled device in the system according to the second embodiment.
FIG. 9 is a table showing an example of a network configuration information table.

FIG. 9 shows an example of a network configuration information table including a plurality of pieces of network configuration information. The network configuration information can include, for example, an identification number, a data name, a data type, a data size, and a data offset. The identification number is a number assigned to one of the plurality of controlled devices 121, 122, and 123 in the system 100. In the example shown in FIG. 9, identification numbers 1, 2, and 3 are assigned to the controlled devices 121, 122, and 123, respectively. The network configuration information identified by identification number 1 is network configuration information for the controlled device 121. The network configuration information identified by identification number 2 is network configuration information for the controlled device 122. The network configuration information identified by identification number 3 is network configuration information for the controlled device 123.

The data name is an example of an identifier for uniquely identifying data (data type, data size, and data offset) corresponding to itself. The data type indicates the direction of data in a daisy chain. The data type of data transmitted from the main control device (or another controlled device) to the controlled device assigned with the data is defined as “output”. Furthermore, the data type of data transmitted from the controlled device assigned with the data to the main control device (or another controlled device) is defined as "input". The data size indicates the size of the data assigned to one controlled device (one data area). The unit of the data size is, for example, bytes. The data offset indicates a start position (a relative start position with respect to the head of a data frame), in the data frame, of the data assigned to one controlled device (one data area). The unit of the data offset is, for example, bytes.

FIG. 10 visually shows the structure of a data frame set by the data frame setter 203 based on the network configuration information table exemplified in FIG. 9. The example shown in FIGS. 9 and 10 will be described below. Input data 1 (Data_In_1) assigned to the first controlled device 121 is data to be transmitted from the first controlled device 121 to the main control device 110 (or another controlled device), that is, data to be written in the data frame by the first controlled device 121. Output data 1 (Data_Out_1) assigned to the first controlled device 121 is data to be transmitted from the main control device 110 (or another controlled device) to the first controlled device 121, that is, data to be read from the data frame by the first controlled device 121. Input data 1 (Data_In_1) and output data 1 (Data_Out_1) are both written in a data area with the data offset=0, that is, the same data area. Note that in the data area with the data offset=0, the main control device 110 (or another controlled device) writes output data 1 (Data_Out_1), and then upon receiving the data, the first controlled device 121 overwrites the data with input data 1 (Data_In_1).

Input data 2 (Data_In_2) assigned to the second controlled device 122 is data to be transmitted from the second controlled device 122 to the main control device 110 (or another controlled device), that is, data to be written in the data frame by the second controlled device 122. Output data 2 (Data_Out_2) assigned to the second controlled device 122 is data to be transmitted from the main control device 110 (or another controlled device) to the second controlled device 122, that is, data to be read from the data frame by the second controlled device 122. Input data 2 (Data_In_2) and output data 2 (Data_Out_2) are both written in a data area with the data offset=8, that is, the same data area. Note that in the data area with the data offset=8, the main control device 110 (or another controlled device) writes output data 2 (Data_Out_2), and then upon receiving the data, the second controlled device 122 overwrites the data with input data 2 (Data_In_2).

Input data 3 (Data_In_3) for the third controlled device 123 is data to be transmitted from the third controlled device 123 to the main control device 110 (or another controlled device). Output data 3 (Data_Out_3) for the third controlled device 123 is data to be transmitted from the main control device 110 (or another controlled device) to the third controlled device 123. Input data 3 (Data_In_3) and output data 3 (Data_Out_3) are both written in a data area with the data offset=16, that is, the same data area. Note that in the data area with the data offset=16, the main control device 110 (or another controlled device) writes output data 3 (Data_Out_3), and then upon receiving the data, the third controlled device 123 overwrites the data with input data 3 (Data_In_3).

FIG. 11 schematically shows read of the data from the data frame and write of the data in the data frame according to a comparative example described with reference to FIGS. 9 and 10. The first controlled device 121 reads output data 1 as command data from a first data area DR1 of the data frame, and then writes input data 1 as response data or the like to output data 1 in the first data area DR1. The second controlled device 122 reads output data 2 as command data from a second data area DR2 of the data frame, and then writes input data 2 as response data or the like to output data 2 in the second data area DR2. The third controlled device 123 reads output data 3 as command data from a third data area DR3 of the data frame, and then writes input data 3 as response data or the like to output data 3 in the third data area DR3.

FIG. 4 exemplifies the arrangement of each of the controlled devices 121, 122, and 123. Each of the controlled devices 121, 122, and 123 can include, for example, a communicator 301, a unit controller 302, and a determiner 303. The communicator 301 is configured to transmit/receive a data frame including a plurality of data areas in a predetermined cycle. The communicator 301 communicates data such as command data, response data, and state data with the main control device 110 via this data frame. Furthermore, the communicator 301 transmits, to the unit controller 302 and the determiner 303, command data received from the main control device 110. The communicator 301 writes data received from the unit controller 302 in the data frame, thereby transmitting the data to the main control device 110. The unit controller 302 controls the corresponding unit (for example, the unit 131 in the case of the unit controller 302 of the controlled device 121) in accordance with the data received from the communicator 301. The determiner 303 performs determination based on the data received from the communicator 301, and can perform change processing of changing processing in the corresponding unit in accordance with the result of the determination. An example of the change processing will be described later.

As an example of the network 140 shown in FIG. 1, EtherCAT® as one Industrial Ethernet® will be described. In EtherCAT®, the main control device connected to the network transmits a data frame to the plurality of controlled devices, and the plurality of controlled devices read/write data from/in the data frame received from the main control device on the fly. At this time, Process Data Object communication (PDO communication) and Service Data Object communication (SDO communication) are used for communication between the main control device and the plurality of controlled devices. PDO communication is communication performed in a predetermined cycle using data called a Process Data Object (PDO). SDO communication is performed in response to a request from the main control device to the controlled device using data called a Service Data Object (SDO). In PDO communication, since a data frame is communicated in a predetermined cycle (for example, every 1 ms), the arrival time of the data is ensured. On the other hand, in SDO communication, since communication is not always completed in one cycle, the arrival time of the data is not ensured.

If EtherCAT® is adopted as the network 140, among nodes connected to the network 140, at least one node functions as the main control device 110 and the remaining nodes function as the controlled devices. The node functioning as the main control device 110 manages (controls) a timing of communicating a data frame in the network 140 and the like.

In the system 100 shown in FIG. 1, the main control device 110 writes the command data for the controlled devices 121, 122, and 123 in a data frame of PDO communication, and transmits the data frame to the first controlled device 121. Upon receiving the data frame from the main control device 110, the first controlled device 121 reads the command data assigned to the first controlled device 121 from the command data written in the data frame, and writes response data to the read command data in the data frame. Then, the first controlled device 121 transmits, to the second controlled device 122, the data frame in which the response data to the command data assigned to the first controlled device 121 has been written. Upon receiving the data frame from the first controlled device 121, the second controlled device 122 reads the command data assigned to the second controlled device 122 from the command data written in the data frame, and writes response data to the read command data in the data frame. Then, the second controlled device 122 transmits, to the third controlled device 123, the data frame in which the response data to the command data assigned to the second controlled device 122 has been written. Upon receiving the data frame from the second controlled device 122, the third controlled device 123 reads the command data assigned to the third controlled device 123 from the command data written in the data frame, and writes response data to the read command data in the data frame. Then, the third controlled device 123 transmits, to the main control device 110 via the first controlled device 121 and the second controlled device 122, the data frame in which the response to the command data assigned to the third controlled device 123 has been written.

Figure 5:
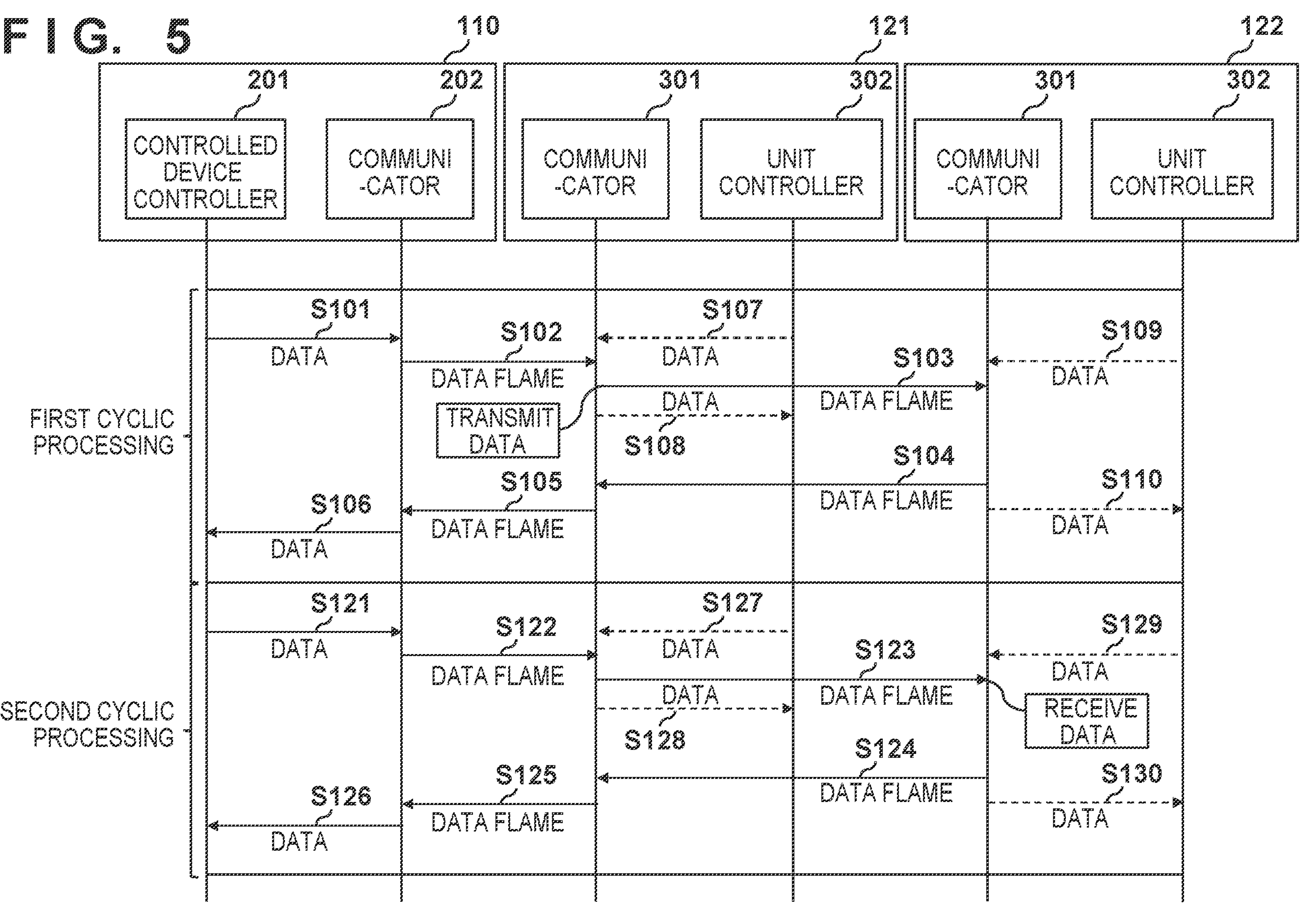
FIG. 5 is a sequence chart exemplifying a data flow according to a comparative example.

Communication between the controlled devices according to the comparative example will now be described. FIG. 5 exemplifies a data flow according to the comparative example. In the comparative example shown in FIG. 5, the two controlled devices 121 and 122 are exemplified as the controlled devices communicably connected to the main control device 110 but the number of controlled devices is not limited to two and may be three or more.

Communication between the main control device and the controlled devices will be described first. In first cyclic processing, the controlled device controller 201 of the main control device 110 transmits command data for the first controlled device 121 and the second controlled device 122 to the communication controller 202 of the main control device 110 (S101). The communication controller 202 of the main control device 110 transmits a data frame including the command data to the first controlled device 121 via the network 140 (S102). The communicator 301 of the first controlled device 121 reads the command data assigned to the first controlled device 121 from the command data written in the data frame. Then, the communicator 301 of the first controlled device 121 acquires response data to the read command data from the unit controller 302 of the first controlled device 121 (S107), and writes the response data in the data frame. Then, the communicator 301 of the first controlled device 121 transmits, to the second controlled device 122, the data frame in which the response data to the command data assigned to the first controlled device 121 has been written (S103). Furthermore, the communicator 301 of the first controlled device 121 transmits the command data to the unit controller 302 (S108).

Upon receiving the data frame from the first controlled device 121, the communicator 301 of the second controlled device 122 reads the command data assigned to the second controlled device 122 from the command data written in the data frame. Then, the communicator 301 of the second controlled device 122 acquires response data to the read command data from the unit controller 302 (S109), and writes the response data in the data frame. Then, the communicator 301 of the second controlled device 122 transmits, to the main control device 110 via the first controlled device 121, the data frame in which the response data to the command data assigned to the second controlled device 122 has been written (S104 and S105). Furthermore, the communicator 301 of the second controlled device 122 transmits the command data to the unit controller 302 (S110).

In the main control device 110, the communication controller 202 of the main control device 110 reads the response data of the first controlled device 121 and the second controlled device 122 written in the data frame, and transmits the read response data to the controlled device controller 201 of the main control device 110 (S106).

S121 to S126 in second cyclic processing are the same as S101 to S106 in the first cyclic processing and a detailed description thereof will be omitted.

Next, communication for causing the second controlled device 122 to acquire the state data of the first controlled device 121 will be described. If the second controlled device 122 is caused to acquire the state data of the first controlled device 121, in the first cyclic processing, the communicator 301 of the first controlled device 121 transmits, to the second controlled device 122, the data frame in which the state data of the first controlled device 121 has been written (S103). However, upon receiving the data frame from the first controlled device 121, the communicator 301 of the second controlled device 122 can read only data in the data area, assigned to the second controlled device 122, of the data frame. Therefore, the communicator 301 of the second controlled device 122 cannot read the state data written in the data area, assigned to the first controlled device 121, of the data frame.

To cope with this, upon receiving the data frame from the first controlled device 121, the communicator 301 of the second controlled device 122 transmits the data frame to the main control device 110 via the first controlled device 121 (S104 and S105). Then, in the second cyclic processing, upon receiving the data frame from the first controlled device 121, the communication controller 202 of the main control device 110 reads the state data of the first controlled device 121 from the state data written in the data frame. Then, the communication controller 202 of the main control device 110 writes the read state data in the data area, assigned to the second controlled device 122, of the data frame. After that, the communicator 301 of the main control device 110 transmits the data frame to the second controlled device 122 via the first controlled device 121 (S122 and S123). Upon receiving the data frame from the main control device 110 via the first controlled device 121, the communicator 301 of the second controlled device 122 reads the state data of the first controlled device 121 from the data area, assigned to the second controlled device 122, of the data frame.

As described above, according to the comparative example, an operation of causing another controlled device to acquire data of a controlled device needs to be performed via the main control device. Furthermore, communication is thus not completed in one cycle, and requires at least two cycles.

To cope with this, in this embodiment, the controlled devices directly communicate with each other without intervention of the main control device. This can transfer data between the controlled devices in one cycle.

Communication between the controlled devices according to this embodiment will be described below. FIG. 12 exemplifies a network configuration information table according to this embodiment. In the example shown in FIG. 12, a data area in which the first controlled device 121 should write input data (Data_In_1) and a data area from which the second controlled device 122 should read output data (Data_Out_2) are the same. Note that in the example shown in FIG. 12, only input data (the data area in which the first controlled device 121 should write data) is assigned to the first controlled device 121, and only output data (the data area from which the second controlled device 122 should read data) is assigned to the second controlled device 122. However, this is merely an example. Output data may further be assigned to the first controlled device 121, and input data may further be assigned to the second controlled device 122.

The communication controller 202 of the main control device 110 can provide or instruct, by, for example, SDO communication, to the first controlled device 121, information representing the data area in which the first controlled device 121 should write data. The communication controller 202 of the main control device 110 can provide or instruct, by, for example, SDO communication, to the second controlled device 122, information representing the data area from which the second controlled device 122 should read data.

Figure 13:
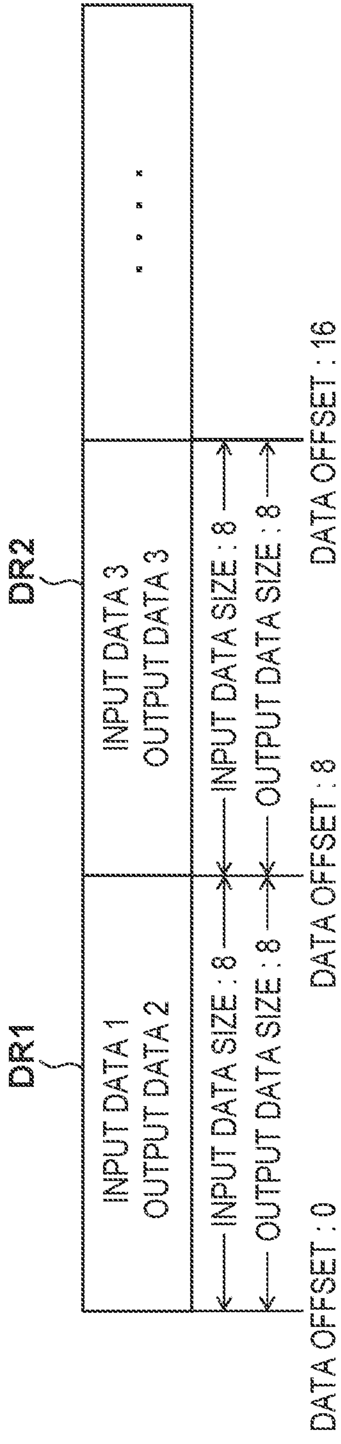
FIG. 13 is a view exemplifying the structure of a data frame.

FIG. 13 visually shows the structure of a data frame set by the data frame setter 203 based on the network configuration information table exemplified in FIG. 12. The example shown in FIGS. 12 and 13 will be described below. Input data 1 (Data_In_1) with the data size=8 of the first controlled device 121 and output data 2 (Data_Out_2) with the data size=8 of the second controlled device 122 are assigned to the same data area with the data offset=0. This allows the second controlled device 122 to read, from the data area, the data written in the data area by the first controlled device 121. This operation is performed in one cycle. Note that in the example shown in FIGS. 12 and 13, with respect to the third controlled device 123, input data 3 (Data_In_3) with the data size=8 and output data 3 (Data_Out_3) with the data size=8 are assigned to the same area with the data offset=8.

FIG. 14 schematically shows read of the data from the data frame and write of the data in the data frame according to this embodiment described with reference to FIGS. 12 and 13. The first controlled device 121 writes input data 1 in the first data area DR1 of the data frame. The second controlled device 122 reads, from the first data area DR1 of the data frame, as output data 2, input data 1 written in the first data area DR1 of the data frame by the first controlled device 121. The third controlled device 123 reads output data 3 from the second data area DR2 of the data frame, and writes input data 3 in the second data area DR2 of the data frame.

Figure 6:
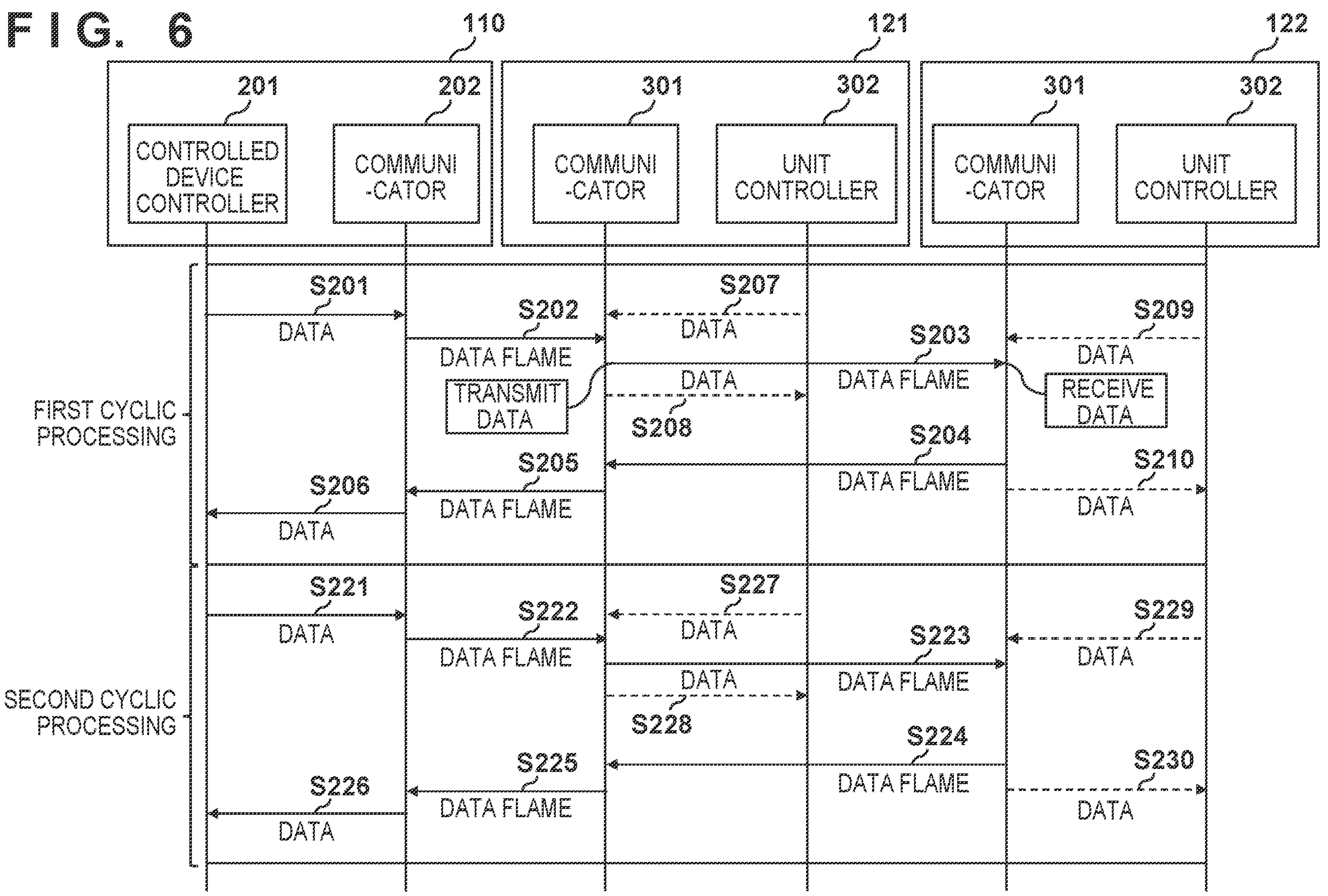
FIG. 6 is a sequence chart exemplifying a data flow in the system according to the first embodiment.

FIG. 6 exemplifies a data flow in the system 100 according to the first embodiment. In the example shown in FIG. 6, the two controlled devices 121 and 122 are exemplified as the controlled devices communicably connected to the main control device 110 but the number of controlled devices is not limited to two and may be three or more. S201 to S210 in FIG. 6 are the same as S101 to S110 in FIGS. 5, S221 to S230 in FIG. 6 are the same as S121 to S130 in FIG. 5, and a detailed description thereof will be omitted.

In the first cyclic processing, the state data of the first controlled device 121 is transmitted to the second controlled device 122. More specifically, the communicator 301 of the first controlled device 121 writes the state data of the first controlled device 121 in the data area assigned with the input data of the first controlled device 121 and the output data of the second controlled device 122. Then, the communicator 301 of the first controlled device 121 transmits the data frame to the second controlled device 122 (S203). Upon receiving the data frame from the first controlled device 121, the communicator 301 of the second controlled device 122 reads the state data of the first controlled device 121 from the data area, assigned with the output data of the second controlled device 122, of the data frame.

As described above, in the system according to the first embodiment, since the controlled devices can directly communicate with each other without intervention of the main control device, the controlled devices can communicate with each other in one cycle.

A system 100 according to the second embodiment will be described below with reference to FIGS. 7 and 8. Matters not mentioned in the second embodiment can comply with the first embodiment. FIG. 8 exemplifies the operation of a second controlled device 122 that receives the state data of a first controlled device 121. In step S11, a communicator 301 of the second controlled device 122 reads the state data of the first controlled device 121 from a data area, assigned with the output data of the second controlled device 122, of a data frame received from the first controlled device 121. In step S12, a determiner 303 of the second controlled device 122 determines whether the state data of the first controlled device 121 read in step S11 satisfies a preset condition. If it is determined in step S12 that the state data satisfies the condition, the determiner 303 of the second controlled device 122 transmits, in step S13, preset control data to a unit controller 302 of the second controlled device 122. In step S13, the unit controller 302 of the second controlled device 122 changes processing of the unit 132, and returns the process to step S11. Alternatively, if it is not determined in step S12 that the state data satisfies the condition, the determiner 303 returns the process to step S11. If the state data of the first controlled device 121 satisfies the preset condition, processing of changing the processing of the unit 132 by the second controlled device 122 is executed.

FIG. 7 exemplifies a data flow in the system 100 according to the second embodiment. In the example shown in FIG. 7, the two controlled devices 121 and 122 are exemplified as controlled devices communicably connected to a main control device 110 but the number of controlled devices is not limited to two and may be three or more. S301 to S306 in FIG. 7 are the same as S101 to S106 in FIGS. 5, S321 to S326 in FIG. 7 are the same as S121 to S126 in FIG. 5, and a detailed description thereof will be omitted.

In first cyclic processing, the communicator 301 of the second controlled device 122 reads the state data of the first controlled device 121 from the data area, assigned to the output data of the second controlled device 122, of the data frame received from the first controlled device 121. Then, the communicator 301 of the second controlled device 122 transmits the state data to the determiner 303 of the second controlled device 122 (S310). The determiner 303 of the second controlled device 122 determines whether the state data satisfies the preset condition. In the example shown in FIG. 7, the determiner 303 of the second controlled device 122 determines that the state data of the first controlled device 121 satisfies the preset condition. Therefore, the determiner 303 of the second controlled device 122 transmits the preset control data to the unit controller 302 of the second controlled device 122 (S311). Then, the unit controller 302 of the second controlled device 122 changes the processing of the unit 132.

If the state data of the first controlled device 121 satisfies the preset condition, in an example, the unit controller 302 of the second controlled device 122 may stop the operation of the unit 132. Furthermore, if the state data of the first controlled device 121 satisfies the preset condition, the unit controller 302 of the second controlled device 122 may display information concerning an occurring abnormality on the screen of the display device of the main control device 110, as abnormality processing. The information concerning the abnormality can include a message for reporting the occurrence of the abnormality, contents of the occurring abnormality, a cause, or information concerning a coping method.

In the system 100 according to the second embodiment, since the controlled devices can directly communicate with each other without intervention of the main control device, the controlled devices can quickly communicate with each other in one cycle. In addition, it is possible to quickly change control of the second controlled device in accordance with the state data of the first controlled device.

An example in which the system 100 according to each of the first and second embodiments is applied to a substrate processing device will be described below. The substrate processing device is formed as a device for processing a substrate. The plurality of units 131, 132, and 133 form part of the substrate processing device. As a practical example of the substrate processing device, an exposure device or a lithography device for forming a pattern on a substrate will be described below but the substrate processing device is not limited to this. For example, the system 100 is also applicable to a lithography device or a substrate processing device such as an imprint device that forms a pattern of an imprint material on a substrate using a mold, and a drawing device that draws a pattern on a substrate using a charged particle beam. Furthermore, the system 100 is applicable to a substrate processing device such as an application device that applies a photosensitive medium onto the surface of a substrate, and a developing device that develops a substrate on which a pattern has been transferred. The system 100 is also applicable to a substrate processing device such as a deposition device (a CVD device or the like), a machining device (a laser machining device or the like), and an inspection device (an overlay inspection device).

Figure 15:
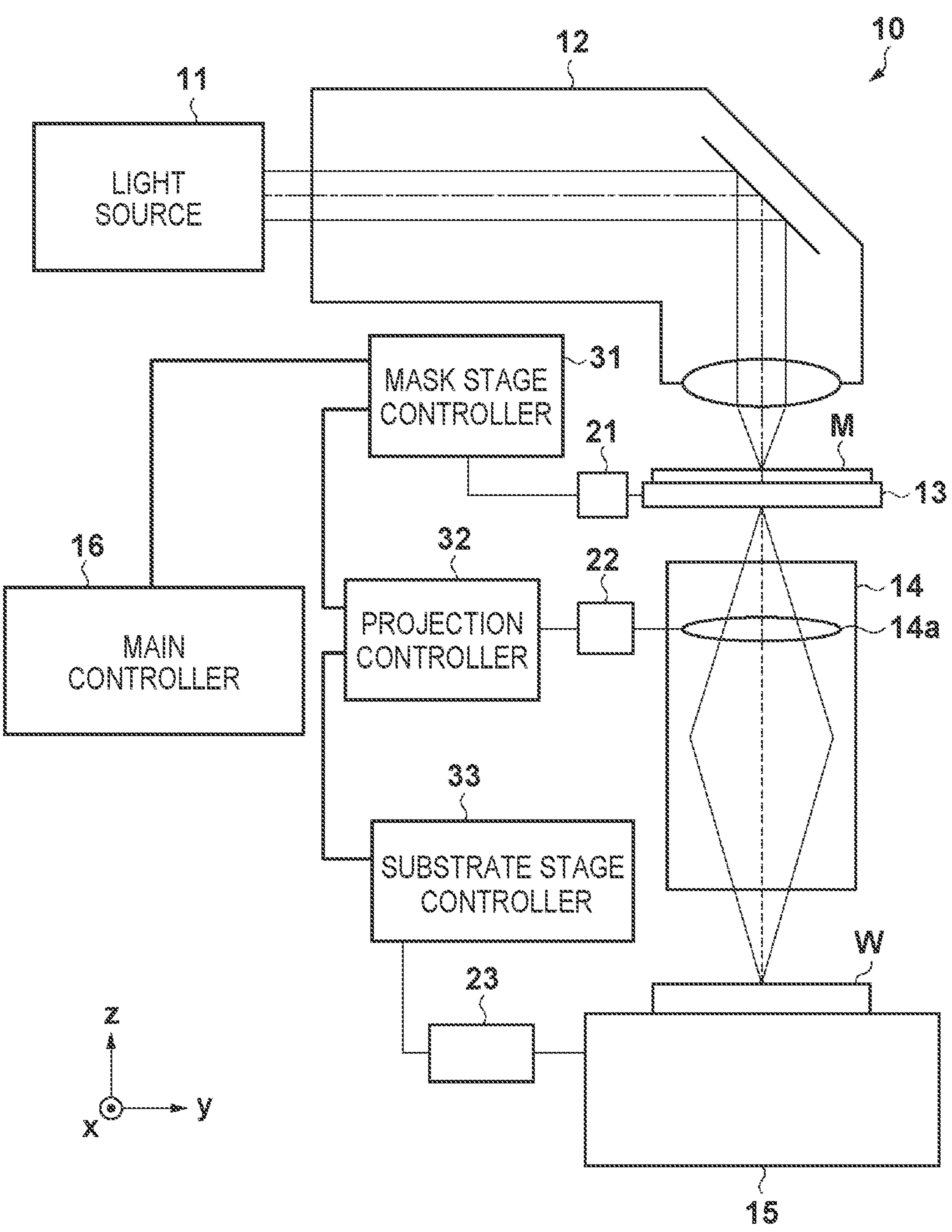
FIG. 15 is a view showing the arrangement of an exposure device as a substrate processing device or a lithography device.

FIG. 15 exemplifies the arrangement of an exposure device 10 as an example of a substrate processing device or a lithography device. The exposure device 10 exposes a substrate W by projecting a pattern of a mask M (original) onto the substrate W via a projection optical system 14. The exposure device 10 can include a light source 11, an illumination optical system 12, a mask stage (original stage) 13, the projection optical system 14, a substrate stage 15, and a main controller 16. The exposure device 10 can also include a first driver 21 that drives the mask stage 13, a second driver 22 that drives a lens 14*a* of the projection optical system 14, and a third driver 23 that drives the substrate stage 15. The first driver 21, the second driver 22, and the third driver 23 function as a mechanism that performs at least part of processing of forming the pattern on the substrate W, and are controlled by a mask stage controller 31, a projection controller 32, and a substrate stage controller 33, respectively. Furthermore, the main controller 16 includes, for example, a CPU (processor) and a storage device, and controls the overall exposure device 10 (each unit of the exposure device 10) by controlling the mask stage controller 31, the projection controller 32, and the substrate stage controller 33.

The light source 11 emits exposure light. The illumination optical system 12 illuminates the mask M using the light emitted from the light source 11. The mask stage 13 holds the mask M, and can be, for example, configured to be movable in the x and y directions by the first driver 21. The projection optical system 14 projects, onto the substrate, the pattern of the mask M illuminated by the illumination optical system 12. The projection optical system 14 includes the lens 14*a* that is, for example, movable in the x direction by the second driver 22. The substrate stage 15 holds the substrate W, and can be, for example, configured to be movable in the x and y directions by the third driver 23.

If the system 100 is applied to the exposure device 10 exemplified in FIG. 15, the main controller 16 can be configured as the main control device 110. In addition, each of the mask stage controller 31, the projection controller 32, and the substrate stage controller 33 can be configured as a controlled device. Each of the first driver 21, the second driver 22, and the third driver 23 can be configured as a unit. Communication is performed between the main controller 16 and the mask stage controller 31, the projection controller 32, and the substrate stage controller 33 via the network 140 in a predetermined cycle.

As an example of a case where the system 100 is applied to the exposure device 10, a case where the main control device 110 communicates with the mask stage controller 31, the projection controller 32, and the substrate stage controller 33 will now be described. The controlled device controller 201 executes control processing of generating command data for controlling the mask stage controller 31, the projection controller 32, and the substrate stage controller 33, and the like.

The communication controller 202 transmits the command data written in the transmission buffer by the controlled device controller 201 to the mask stage controller 31, the projection controller 32, and the substrate stage controller 33, respectively, in a predetermined cycle. The communication controller 202 receives response data to the command data from the mask stage controller 31, the projection controller 32, and the substrate stage controller 33, respectively.

Furthermore, the determiner 303 of the substrate stage controller 33 receives the state data of the projection controller 32 in one cycle. The state data can include, for example, data representing a state in which an abnormality has occurred in the projection controller 32 or the second driver 22. The determiner 303 of the substrate stage controller 33 quickly changes control of the substrate stage in accordance with the state data of the projection controller 32.

As described above, in the exposure device according to this embodiment, since the controlled devices can directly communicate with each other without intervention of the main control device, the controlled devices can quickly communicate with each other in one cycle. In addition, it is possible to quickly change control of the second controlled device in accordance with the state data of the first controlled device.

An article manufacturing method according to an embodiment is suitable for, for example, manufacturing an article such as a microdevice like a semiconductor device and an element having a microstructure. The article manufacturing method of this embodiment includes a step of processing a substrate using the above-described substrate processing device, and a step of manufacturing an article from the substrate processed in the above step. In addition, the manufacturing method can include well-known steps (exposure, oxidation, film formation, deposition, doping, planarization, etching, resist removal, dicing, bonding, packaging, and the like). The article manufacturing method of this embodiment is more advantageous than the conventional methods in at least one of the performance, quality, productivity, and production cost of the article.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of all the embodiments can be performed not only independently but also in any combination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-145571, filed Sep. 13, 2022, which is hereby incorporated by reference herein in its entirety.

What is claimed is:

1. A system comprising:

a plurality of controlled devices including a first controlled device and a second controlled device; and a main control device connected to the plurality of controlled devices via a network and configured to control the plurality of controlled devices, the main control device including:

a communicator configured to transmit and receive a data frame including a plurality of data areas via the network in a predetermined cycle; and a setter configured to set a structure of the data frame, wherein the setter includes a function of setting a same data area in the data frame where the first controlled device writes data and where the second controlled device reads data.

2. The system according to claim 1, wherein the second controlled device reads, from the same data area, data written by the first controlled device, and executes processing corresponding to the data.

3. The system according to claim 1, wherein the same data area is an area specified by one data offset in the data frame.

4. The system according to claim 1, wherein write of data in the same data area by the first controlled device and read of data from the same data area by the second controlled device are performed in a same cycle.

5. The system according to claim 1, wherein the first controlled device writes data representing a state of the first controlled device in the same data area.

6. The system according to claim 1, wherein the setter sets the same data area based on network configuration information representing a configuration of the network.

7. The system according to claim 6, wherein:

the communicator provides, by service data object communication, to the first controlled device, information representing a data area in which the first controlled device should write data, and the communicator provides, by service data object communication, to the second controlled device, information representing a data area from which the second controlled device should read data.

8. The system according to claim 1, wherein the main control device and the plurality of controlled devices are connected to form a daisy chain.

9. The system according to claim 8, wherein in the daisy chain, the first controlled device is arranged between the main control device and the second controlled device.

10. The system according to claim 1, further comprising a plurality of units configured to be controlled by the plurality of controlled devices, respectively.

11. The system according to claim 10, wherein the plurality of units form part of a substrate processing device configured to process a substrate.

12. The system according to claim 11, wherein the substrate processing device comprises a lithography device configured to form a pattern on the substrate.

13. An article manufacturing method comprising obtaining an article from a substrate by processing the substrate using a system defined in claim 11.

14. A system comprising:

a main control device connected to a plurality of controlled devices, which includes a first controlled device and a second controlled device, via a network and configured to control the plurality of controlled devices, wherein the main control device includes:

a communicator configured to communicate a data frame including a plurality of data areas via a network in a predetermined cycle; and a setter configured to set a structure of the data frame, wherein the setter-includes a function of setting a same data area in the data frame where the first controlled device writes data and where the second controlled device reads data.

15. A control method for a system including a plurality of controlled devices including a first controlled device and a second controlled device, and a main control device connected to the plurality of controlled devices via a network and configured to control the plurality of controlled devices, the method comprising:

causing the main control device to communicate a data frame including a plurality of data areas via the network in a predetermined cycle;

causing the main control device to set a structure of the data frame including setting a same data area in the data frame where the first controlled device writes data where the second controlled device reads data.

16. The method according to claim 15, further comprising causing the second controlled device to read data assigned to the second controlled device from the data frame and execute processing corresponding to the data.

17. The method according to claim 15, wherein the same area is an area specified by one data offset in the data frame.

18. The method according to claim 15, wherein write of data in the same data area by the first controlled device and read of data from the same data area by the second controlled device are performed in a same cycle.

19. A non-transitory computer readable medium storing a program for causing a computer to execute control according to a control method defined in claim 15.

20. The system according to claim 1, wherein:

the system is an exposure device, the first controlled device is one of a mask stage controller, a projection controller, or a substrate stage controller, and the second controlled device is another of the mask stage controller, the projection controller, or the substrate stage controller.

21. The system according to claim 1, wherein the structure of the data frame set by the setter allows the first controlled device to write input data and the second controlled device to read the input data, as output data, without intervention of the main control device within a single cycle processing, during which:

the communicator transmits the data frame to the first controlled device;

the first controlled device transmits the received data frame, with the input data written by the first controlled device in the same data area of the data frame, to the second controlled device; and the second controlled device reads the output data from the same data area of the received data frame and transmits the received data frame to the communicator, via the first controlled device.

* * * * *